United States Patent

Stuck

[15] 3,695,651

[45] Oct. 3, 1972

[54] BALL JOINT WITH COVER PLATE

[72] Inventor: Klaus Stuck, Buderich, Germany

[73] Assignee: A. Ehrenreich & Cie., Duesseldorf-Oberkassel, Germany

[22] Filed: Sept. 22, 1970

[21] Appl. No.: 74,325

[30] Foreign Application Priority Data

Oct. 21, 1969 Germany..........P 19 53 000.8

[52] U.S. Cl.................287/87, 29/149.5 B, 29/470.3
[51] Int. Cl.............................................F16c 11/06
[58] Field of Search....287/87, 90 R, 90 C; 29/470.3, 29/149.5 B

[56] References Cited

UNITED STATES PATENTS

| | | |
|---|---|---|
| 3,073,634 | 11/1963 | Gottschald...............287/90 C |
| 3,235,312 | 2/1966 | Hollander..............29/470.3 X |
| 3,058,765 | 10/1962 | Thomas....................287/90 C |
| 2,872,206 | 2/1959 | Cislo....................287/90 R X |
| 2,424,431 | 7/1947 | Booth...................287/90 C X |
| 3,129,023 | 4/1964 | Fierstine..................287/90 C |
| 2,880,025 | 3/1959 | Herbenar et al. ....287/90 R X |

FOREIGN PATENTS OR APPLICATIONS

| | | |
|---|---|---|
| 1,098,381 | 1/1961 | Germany.................287/90 R |
| 625,100 | 2/1936 | Germany.................287/90 R |

*Primary Examiner*—Andrew V. Kundrat
*Attorney*—Arthur Schwartz

[57] ABSTRACT

A ball and socket joint having a cover plate connected to the peripheral edge of the joint housing by a friction weld.

8 Claims, 4 Drawing Figures

PATENTED OCT 3 1972   3,695,651

INVENTOR
KLAUS STUHL
BY:
Arthur Schwartz
ATTORNEY

BALL JOINT WITH COVER PLATE

BACKGROUND OF THE INVENTION

1. Field of the Invention

The invention relates to ball joints, and in particular to ball joints for motor vehicles used, for example, in their steering linkage or in their wheel suspension linkage, where the ball element is supported for omnidirectional motion within hollow spherical surfaces inside the joint housing. The joint housing is closed on one side by a cover plate which also retains and supports the joint elements inside the housing cavity.

2. Description of the Prior Art

In known versions of ball joints with cover plates, the latter are normally crimped to the housing. For this purpose, the inner diameter of the covered end of the housing includes a supporting shoulder for the edge of the cover plate. The adjacent wall of the joint housing extends above the inserted cover plate. In the crimping operation, this wall is rolled toward the inside and over the outer surface margin of the cover plate. This design requires a greater amount of metal for the housing which, in the case of mass-produced articles such as these ball joints, is of considerable importance in terms of cost. It is also known to spot weld the cover plate to the joint housing when the latter is made of sheet metal. In this case, the housing has an exterior flange and the cover plate has an accordingly enlarged diameter. A gasket must in this case be placed between the cover plate and the joint housing.

SUMMARY OF THE INVENTION

The purpose underlying the present invention is to provide a ball joint of the earlier-mentioned type with a cover plate, where the closure by means of a cover plate requires no additional metal on the joint housing. Nor is there any unnecessary increase in height of the housing. At the same time there is provided a perfect seal without the need of additional sealing elements.

To attain the above object, the invention includes a ball joint wherein the edge of the cover plate is friction-welded to the joint housing, while being separated from the other joint elements in the body cavity by means of an insulating layer and/or an anti-friction layer which prevents the creation of excessive frictional heat.

In this manner it is possible to manufacture ball joints in a simple manner with an optimal material economy for the joint housing and with a perfectly tight cover closure. Any possible wear of the abutment faces during the friction-welding operation is negligible, as it affects only the exterior height of the joint. The design dimensions can also be adjusted accordingly.

The process of friction welding itself is well known. In it, the heat created through friction between metal surfaces is used to weld the surfaces together. This effect is obtained by rotating the two parts to be welded relative to one another under the application of pressure. The parts are circular in configuration and positioned to have a common axis. Rotation is created either on one part or on both parts in opposite directions. As soon as the necessary temperature between the surfaces is reached, the drive is preferably stopped immediately.

For a ball joint where the housing cavity holds at least one hollow spherical insert on the cover side to support the ball element directly against the cover plate, the invention contemplates the provision of a washer of heat-insulating and heat-resistant material such as asbestos between the cover plate and the insert which bears against the cover plate.

It is also recommended to give the cover plate a dome-shaped outline which, as such, is known. The dome includes the entire surface of the cover plate, except for the edge surface where it abuts against the joint housing. This ball joint offers the special advantage that no additional measures are necessary in the region of the domed cover plate portion to prevent a weld-producing heat buildup therein.

It is suggested to provide on the cover side extremity of the housing bore an enlarged bore portion to form a weld shoulder for the cover plate. This inside shoulder permits easy positioning of the cover plate relative to the housing and assures its centering at all times.

The joint of the invention is preferably so constructed that, when ball cups are used to support the ball element, at least the ball cup abutting the cover plate is made of an elastic material, particularly polyurethane plastic of a cross-linked molecular structure. In the alternative, an elastic intermediary part with an insulating layer is provided between the end face of the ball cup and the cover plate, so as to produce, inspite of the friction welding assembly, a resilient pressure between the the ball element and the ball cups. The ball element is thus retained backlash-free and self-adjustingly in its bearing position. A similar result is achieved, when the ball cup on the joint pin side of the ball is made of an elastic material. It is of course also possible to make both ball cups of such an elastic material. The invention can also be applied to ball joints having an elastic inner lining in the joint housing and/or an elastic shroud around the ball end.

A further variation of the invention suggests a cover in the form of a cylindrical dish with a peripheral flange. Such a cover makes it possible to use a chuck for the assembly of the cover, the jaws of the chuck gripping the cover at its cylindrical portion.

BRIEF DESCRIPTION OF THE DRAWING

In the accompanying drawing are illustrated, by way of example, several embodiments of the invention, represented in the various figures as follows.

DESCRIPTION OF THE PREFERRED EMBODIMENTS

Figure 1:
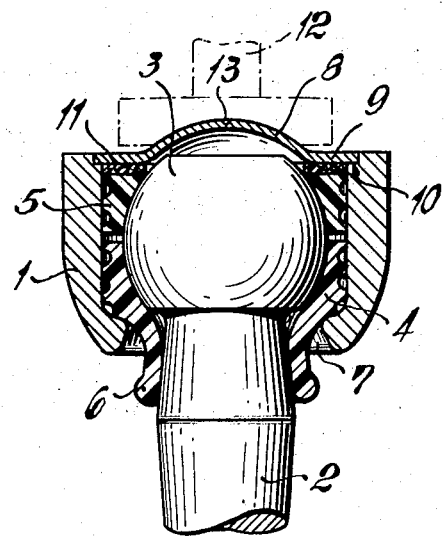
FIG. 1 shows a vertical cross-section of a ball joint embodying the invention.

The ball joint illustrated in FIG. 1 consists of a joint body or housing 1 and a joint pin 2 having on its upper extremity a ball element 3. The ball element 3 is supported between two ball cups 4 and 5 inserted in the cavity of the housing 1 so as to give the joint pin mobility in all directions. In the embodiment shown, the ball cups 4 and 5 consist of an elastic material, for example, polyurethane plastic having a cross-linked molecular structure. The lower ball cup 4 has an extension in the form of a sealing collar 6 which reaches through the lower housing opening 7 through which the pin 2 of the ball joint extends. The sealing collar 6 surrounds the joint pin 2.

On the side opposite to the housing opening 7 for the joint pin 2, the joint housing 1 is closed by a cover plate 8 whose center portion is domed to the outside. The peripheral edge 9 of the cover plate 8 is supported by an interior shoulder 10 in the bore of the housing 1. This interior shoulder may be larger than shown in the drawing. The shoulder 10 is formed by an enlarged-diameter portion at the upper end of the housing bore. Between the cover plate edge 9 and the adjacent face of the upper ball cup 5 is arranged an insulating annular disc 11 made, for example, of asbestos. In addition, the abutting surfaces of the disc 11 may be covered by an anti-friction film of lubricant.

The cover plate edge 9 is permanently connected to the joint body 1 by a friction weld.

One possibility to effect the above friction weld is to provide an electromagnet which is movable in the axis of the body bore toward the cover plate 8, the electromagnet being rotatable. This magnet is indicated at 12 in FIG. 1. On its lower face, the electromagnet has a concave contour matching the domed shape of the cover plate 8. The face of the magnet may include in its center a centering prick 13 which engages a corresponding center punch mark in the cover plate 8. During the friction welding operation, the joint housing 1 is held in a stationary chuck (not shown). The last parts to be inserted into the cavity of the joint housing 1 are the insulating disc 11 and the cover plate 8. The electromagnet 12 is then forcibly moved against the cover plate 8 and energized as well as rotated at a high speed, thereby creating a frictional welding temperature between the inner shoulder 10 and the cover plate edge 9. As soon as the welding temperature is reached, the electromagnet is immediately stopped and de-energized and, following a brief cooling period, the electromagnet is retracted. The forcible approach, the starting and stopping of the rotation, and the retraction, as well as the energizing and de-energizing of the electromagnet can be controlled as a function of time, using, for example, empirically obtained values. At the end of the operation, the assembled ball joint is released from the chuck, and another assembly operation can be started.

The above operation may also be performed by first inserting the cover plate 8 into the energized, retracted electromagnet 12, after which the electromagnet is advanced toward the joint housing 1, thereby pressing the cover plate against the housing opening with its edge 9 engaging the interior housing shoulder 10.

Figure 2:
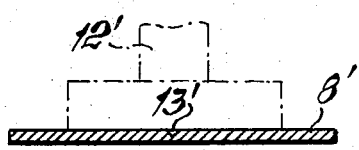
FIG. 2 shows portions of a second embodiment of the invention.

In FIG. 2 is shown a modified embodiment where the cover plate 8 is flat. This flat cover plate is friction-welded onto the flat outside face of the joint body. The electromagnet 12' has a corresponding flat face with a centering prick 13' engaging a center punch mark in the cover plate 8'.

Figure 3:
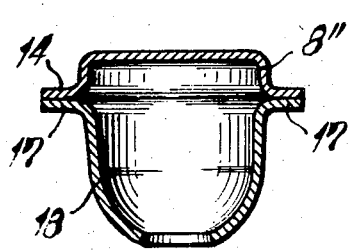
FIG. 3 shows the flanged dish-shaped cover of a third embodiment of the invention.

In the third embodiment shown in FIG. 3, the cover 8'' has the shape of a cylindrical dish, including a peripheral flange 14 which abuts a matching flange 17 of a joint housing 18, which latter is formed from sheet metal. This cover 8'' can be grasped on its cylindrical portion by an axially movable chuck which, while rotating, presses the cover against the fixedly held joint housing 18. When the welding temperature is reached, the chuck holding the cover is immediately stopped. After a brief cooling period, the chuck is released from the cover and retracted. The assembled joint housing and cover can then be released.

Figure 4:
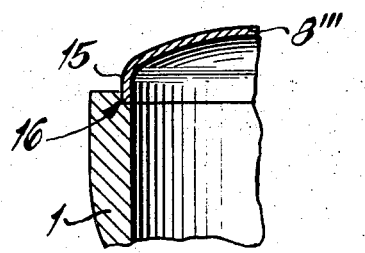
FIG. 4 shows portions of a domed cover plate and of a joint body representing a fourth embodiment of the invention.

In the last embodiment shown in FIG. 4, the domed cover plate 8''' includes a short cylindrical edge portion 15 which extends above the upper face of the joint housing 1 which has a matching enlarged bore portion 16 in which the cover plate 8''' is centered before being welded thereto.

I claim:
1. A ball and socket joint comprising:
   a. a housing,
   b. a ball element in said housing,
   c. a joint pin connected to said ball element and extending from said housing,
   d. a cover plate connected to the peripheral edge of said housing on the end opposite said joint pin by a friction weld,
   e. a layer of heat resistant material for insulating the interior of said housing from heat caused by friction in assembly,
   f. a bearing insert between said ball element and said housing, said layer of heat resistant material being clamped between and against one end of said bearing insert and the bottom of said cover plate, and engaging the inner periphery of said housing adjacent the bottom of said cover plate.

2. A ball and socket joint as defined in claim 1 wherein said housing has a recess at said opposite end and said cover plate being positioned in said recess.

3. A ball and socket joint as defined in claim 1 wherein said cover plate has a dome thereon whereby said cover plate contacts only the peripheral edge of said housing and is not in contact with any other elements of the joint.

4. A ball and socket joint as defined in claim 1 wherein said housing includes an enlarged diameter shoulder and said cover plate being positioned on said shoulder.

5. A ball and socket joint as defined in claim 1 including a pair of ball cups positioned in said housing between the inner wall thereof and said ball element, at least one of said cups being of an elastic material.

6. A ball and socket joint as defined in claim 4 wherein said material is polyurethane plastic having a cross-linked molecular structure.

7. A ball and socket joint as defined in claim 1 wherein said cover is in the form of cylindrical dish having a peripheral flange thereon.

8. A ball and socket joint comprising:
   a. a housing,
   b. a ball element in said housing,
   c. a joint pin connected to said ball element and extending from said housing,
   d. a cover plate connected to the peripheral edge of said housing on the end opposite said joint pin by a friction weld, and
   e. a layer of asbestos for insulating the interior of said housing from heat caused by friction in assembly.

* * * * *